Figure 1:
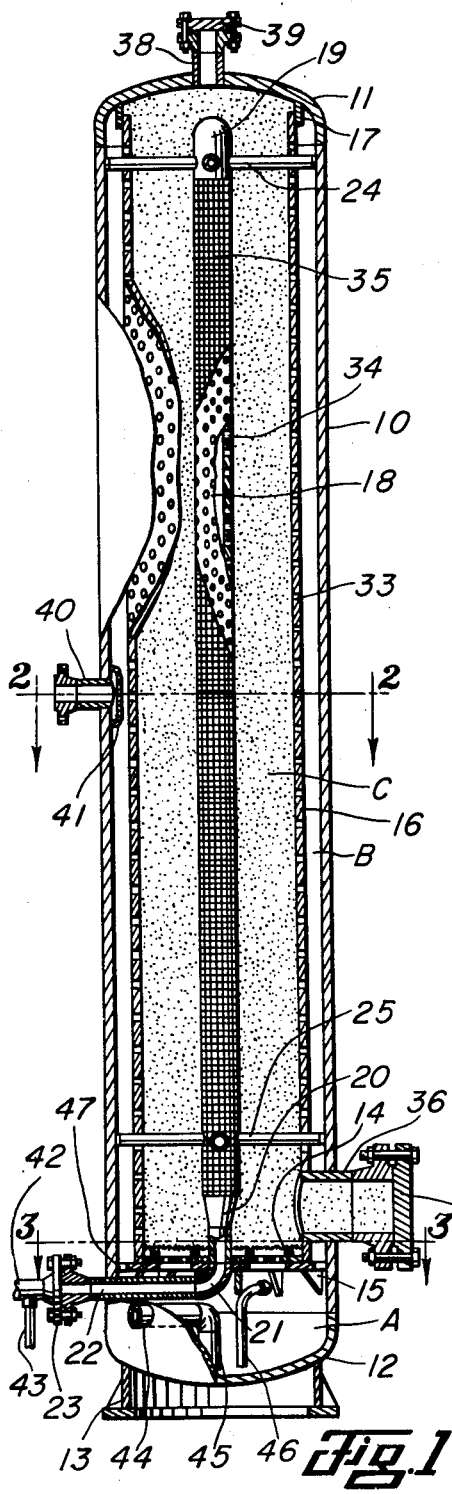

Jan. 27, 1953     J. L. MAHER     2,626,675
SORBING TOWER
Filed Dec. 2, 1949

Joseph L. Maher
INVENTOR.

BY Ahley Ahley
Attorneys

Patented Jan. 27, 1953

2,626,675

UNITED STATES PATENT OFFICE 2,626,675

SORBING TOWER

Joseph L. Maher, Tulsa, Okla., assignor to National Tank Company, Tulsa, Okla., a corporation of Nevada Application December 2, 1949, Serial No. 130,830

4 Claims. (Cl. 183—4.0)

This invention relates to new and useful improvements in sorbing towers.

There are presently many installations or sorbing or desiccant towers employed for drying streams of natural gas, air, and other gases, these towers customarily containing a suitable sorbing material such as alumina, silica gel, or various other types of water, vapor or liquid sorbing material. Customarily, these towers are employed for removing water and water vapor from gases, but they are also employed for removing various other liquids and vapors such as hydrocarbon liquids and vapors from streams of natural gas. It is also customary in the use of these towers to pass a stream of gas through them for a period of time until the effectiveness or absorptive efficiency of the desiccant becomes materially reduced. At this time, the flow of gas is shut off or switched to another tower, and the desiccant tower is reactivated or regenerated, normally by passing therethrough a stream of gas heated to a temperature sufficient to drive liquid and vapor from the desiccant material and to return said material to an active vapor and liquid absorbing state.

In nearly every instance, the drying or desiccating tower comprises an elongate cylindrical tank packed full of the desiccating material. Usually, an inlet is provided at the upper end of the tank with an outlet at the lower end thereof so that the gas being dried or desiccated or treated by a sorbing action flows from the upper end of the tank through the entire body of the desiccant and out through the discharge conductor at the lower end of the tank. Of course, in some instances, the tank is disposed horizontally so that the stream of gas flows from one end thereof to the other. It is further the practice to regenerate or dry the desiccant by passing the heated stream of gas therethrough in a reverse pass, the gas being admitted through the normal discharge conductor and discharging through the normal inlet to the tank. A number of objections and disadvantages inherent in this type of arrangement have been encountered, and the present invention seeks their solution and avoidance.

To begin with, the stream of gas being treated normally passes through the entire length of the column of desiccant and it is therefore necessary that a considerable velocity be maintained in order to pass the necessary quantities of gas through the tower. This high velocity flow of the gas causes some mechanical movement of the particles of desiccant material resulting in attrition and rubbing of the particles against one another whereby said particles are abraded and reduced in size with the consequent production of considerable amounts of fine or powdered material. The powdered material sifts downwardly in the column of desiccant and results in packing with the unavoidable clogging or partial obstruction of the flow spaces between the desiccant particles thereby increasing the resistance offered by the bed of desiccant, impairing the action of the tower, and necessitating the early replacement of the sorbing material with new or undamaged material. I avoid this objectionable result by passing the stream of gas radially through the column of desiccant material whereby the flow area offered to the gas is tremendously increased and a relatively low gas velocity may be employed. The mechanical attrition of the desiccant particles is thus avoided since the particles are not moved about through the action of a rapidly flowing stream of gas, and the life of the desiccant bed or column is greatly increased.

Another objection to the older towers is the direct impingement of the high velocity gas stream upon one end of the desiccant bed or column. Even greater mechanical attrition and packing is observed at this point, and further, "slugs" of liquid which may be carried by the gas stream are caused to contact one concentrated area of the desiccant column resulting in a thorough wetting of this portion of the column and resulting quite often in the cementing together of the desiccant particles at this point. Such action greatly increases the resistance offered by the bed to the flow of gas and quickly renders the bed or column of desiccant completely unusable. An ancillary disadvantage of this action is encountered in reactivating or regenerating a bed of desiccant which has thus been thoroughly wet and partially or completely cemented together. A considerably increased burden or load is placed upon the hot reactivating gas in that the liquids so introduced must be vaporized for removal so that high temperatures and excessively long reactivating periods must be employed. Further, the heat drying or reactivating of a bed in this condition achieves a baking action so that there is an even greater tendency for the thoroughly wetted portions of the desiccant to dry into a cemented or semi-porous solid.

Yet another objection to the high velocity gas flow is found in the tendency of such flows to create channels through the column of desiccant and thus cause incomplete dehydration or desiccation. Here again, I avoid this objection by radial flow of the gas stream.

A considerable problem has existed in accomplishing efficient reactivation of the older type of tower. It is necessary to heat the entire bed to the reactivating temperature, and because of the high pressures under which these gas streams are often flowing and the consequent heaviness of the dehydration towers, a considerable portion of the heat present in the regeneration stream goes to a heating up of the tower shell itself. Further, it is nearly always necessary to insulate the outside of the tower quite extensively to prevent undue loss of the regenerating heat by radiation from the shell. Further, this hot regeneration gas must subsequently be cooled to remove liquefiable components therefrom, and it is manifest that the employment of higher temperatures and large quantities of the high temperature gas considerably increases the amount of cooling which must be effected.

I avoid these objections by passing the hot regeneration gas radially outward from the center or core of the desiccant column and thus have no need of guarding against radiation heat loss and no need to heat the shell of the dehydrator tower. When the regeneration gas reaches the shell, it has completed its heating and reactivating action, and it is indeed desirable to dissipate from the gas its heat at this point to enhance the removal of liquefiable components and to facilitate the subsequent cooling of the regeneration gas which must be accomplished.

The present invention broadly contemplates a sorbing tower shell having located concentrically therewithin an inner perforated shell spaced a short distance from the outer shell with a perforated flume extending axially of the inner shell. With this structure, it is possible to introduce the gas stream into the annulus between the inner and outer shells, and by means of a diverter to cause the flow of gas to be directed circumferentially of said annulus. Direct impingement of the gas stream upon the shell or the desiccant bed is thus avoided, and the high velocity circumferential flow of the gas stream causes it to be spread out uniformly throughout the height of the annulus whereby the gas flow is evenly distributed over the entire outer surface of the inner shell. The circumferential flow also causes any "slugs" of liquid or smaller liquid particles such as drops to be thrown outwardly onto the inner surface of the outer shell from which surface the liquids may drain into the lower portion of the tower. In this manner, the by far major portion, and indeed substantially all, of the liquids present in the incoming stream are removed before the gas ever enters into the desiccant bed, and the disadvantages of such liquid entry into the bed are largely avoided.

Further, the inner perforated flume and the perforated inner shell surrounding said flume are provided with a large number of relatively small openings through which the gas flow passes. The smallness of the openings serves both to retain the desiccant in position and to create a small but noticeable pressure drop in the flowing gas. This creation of a slight back pressure results in the more even distribution of the incoming gas within the annulus between the inner and outer shells and also in the desiccant area between the flume and said inner shell. As a corollary result, when the reverse flow of regenerating gas is commenced, a similar result is observed in distributing the flow of reactivating gas more evenly throughout the entire height of the desiccant column.

It is therefore a particular object of this invention to provide an improved sorbing tower having therein a column of sorbant material and means for directing the flow of a stream of gas radially through said column.

Another object of the invention is to provide an improved sorbing tower having an outer shell and a perforated inner shell with means for directing a gas stream circumferentially of the annulus between said shells.

Yet another object of the invention is to provide an improved sorbing tower having an annular space into which the incoming gas is admitted before passage through the sorbant material and wherein an initial separation of liquids is effected, with means for draining said liquids into a reservoir without allowing the liquids to contaminate the sorbant or desiccant material.

A particular object of the invention is to provide an improved sorbing tower of the character described having means for removing accumulated liquids upon commencement of the reactivation cycle while continuing the maintaining of said liquids separate and out of contact with the sorbant material.

A still further object of the invention is to provide an improved sorbing tower of the character described having means for permitting the draining of liquids from the sorbant tower as well as the draining of liquids initially separated from the incoming gas stream.

Another object of the invention is to provide an improved sorbing tower having a pair of spaced foraminous members between which the sorbant material is disposed, said members being provided with a multiplicity of relatively small openings which cause a noticeable pressure drop in the gas stream passing through said members and the sorbant material, this pressure drop resulting in a back pressure which causes a more even distribution of the gas stream over the surfaces of both foraminous members both within the sorbant bed and prior to admission thereto.

An important object of the invention is to provide an improved sorbing tower of the type adapted to be reactivated by a stream of heated gas in which the gas is introduced through a central flume and passes radially outwardly through the bed of sorbant material whereby the disadvantages of heat radiation from the outer shell of the tower are avoided, and cooling of the used reactivation gas is obtained by passing said gas in heat exchange relationship with the tower shell.

A construction designed to carry out the invention will be hereinafter described together with other features of the invention.

Figure 2:
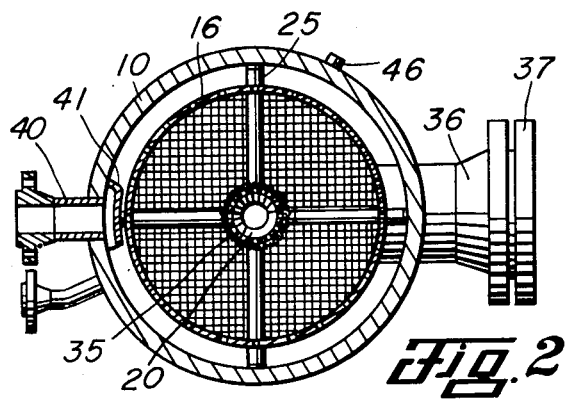
Figure 3:
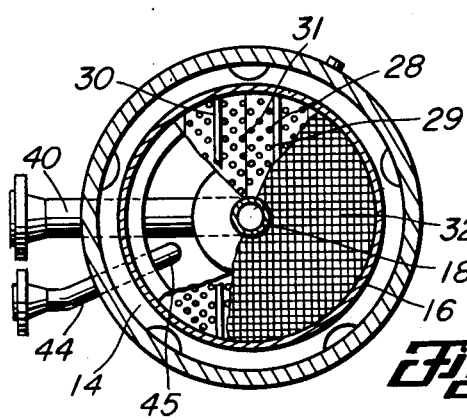
Figure 4:
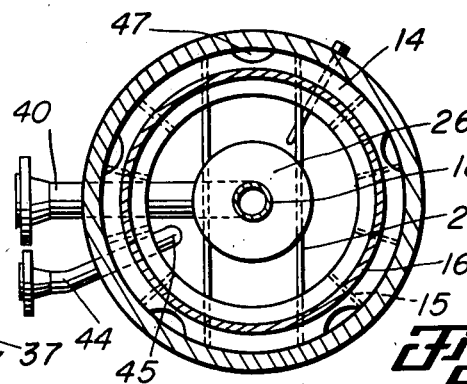

The invention will be more readily understood from a reading of the following specification and by reference to the accompanying drawing, wherein an example of the invention is shown, and wherein:

Fig. 1 is a vertical view, largely in section but partially in elevation of a sorbing tower constructed in accordance with this invention, portions of the tower structure being broken away to illustrate the invention, Fig. 2 is an enlarged, horizontal, cross-sectional view taken upon the line 2—2 of Fig. 1, Fig. 3 is an enlarged, horizontal, cross-sectional view taken upon the line 3—3 of Fig. 1, the elements appearing in the view being partially broken away to illustrate the structure, and Fig. 4 is a view similar to Fig. 3 with the supporting tray structure removed.

In the drawings, the numeral 10 designates an elongate, upright cylindrical vessel or tower having the usual domed top 11 and dished bottom 12. A suitable support 13 is provided for the tower. In the lower portion of the vessel, but spaced above the bottom 12, an annular supporting ring 14 is provided, said ring being secured by welding or any other suitable means to the inner wall of the vessel, and further being supported by a plurality of gusset plates 15 secured to the inner wall of the vessel and abutting the underside of said ring 14. The space within the vessel beneath the supporting forms a liquid collecting chamber A.

An elongate perforated shell 16 is supported upon the ring 14 and extends upwardly therefrom within the interior of the vessel 10. The outside diameter of the shell 16 is somewhat less than the inside diameter of the vessel, whereby an appreciable annular space or annulus B is provided between the shell and the inner wall of the vessel. The shell 16 extends to a point closely adjacent to the underside of the domed head 11, the upper extremity of the shell telescoping a short annular skirt 17 secured to and depending from said head 11. If desired, the shell may be suitably attached to the skirt by bolts or welding (not shown) or in any other suitable fashion.

A central flume 18 formed of a perforated pipe or tube, extends axially of the shell 16 and substantially throughout the length thereof. The upper end 19 of the flume is closed, while the lower end 20 of the flume is reduced in diameter and merges into a laterally directed elbow 21 beneath the horizontal plane of the supporting ring 14. A suitable pipe or conductor 22 extends from the elbow 21 through the side walls of the vessel 10 within the chamber A and is provided upon its outer end with suitable pipe fitting connections 23. For the purpose of centering the flume 18 within the shell 16, and also for spacing the shell 16 equi-distantly from the inner wall of the vessel 10, a plurality of radial braces or guides 24 are affixed to the upper end of the flume and extend radially outwardly through the wall of the shell 16 so as to have their outer ends abutting the inner wall of the vessel 10. The braces 24 may be welded or otherwise suitably secured to the shell 16, the composite structure having a sliding fit within the vessel 10 to permit assembly of the tower while yet providing adequate centering and bracing means. A plurality of similar braces 25 are provided near the lower end of the flume 18, the braces 25 being similarly arranged and connected, and functioning in the same manner.

An annular flange 26 is carried by the upper branch of the elbow 21, said flange projecting an appreciable distance from the elbow and the lower reduced end 20 of the flume 18, and being in horizontal alinement with the supporting ring 14. As will appear more fully hereinafter, the flange 26 aids the ring 14 in supporting the bed of sorbant material, and further strengthening of the structure is achieved by a pair of chordal beams in the form of elongate rectangular plates 27 extending across the lower portion of the vessel 10 within the upper section of the chamber A in engagement with the underside of the ring 14 and the flange 26. The ends of the plates 27 are secured to the inner wall of the vessel 10, and being disposed edgewise, the plates 27 form beams of considerable strength and supporting ability.

A supporting grate 28 rests upon the flange 26 and an inner margin of the ring 14 within the lower portion of the shell 16. The grate 28 is formed of a plurality of transversely extending sections 29, each section being reinforced by a bar 30 secured to its upper surface and extending longitudinally of the section. Forming the grating sections permits its ready insertion and removal and also makes provision for the lower portion of the flume 20 which extends upwardly through the grate. A plurality of openings 31 are scattered over the entire surface of the grate to permit the passage of gas or liquid, and a relatively fine mesh screen or wire cloth panel 32, circular in shape, overlies the grate and is supported thereon.

A column or bed of sorbant material C is disposed within the annular space between the flume 18 and the perforated shell 16. This bed is carried upon the screen 32 and the grate 28 and completely fills the interior of the shell 16 with the exception of the space occupied by the flume 18. Obviously, the screen 32 must be of such mesh as to prevent the downward passage of the particles of sorbant material comprising the bed C. The perforations 33 of the shell 16 are also sufficiently small to prevent the passage of the sorbant particles, as are the perforations 34 of the flume 18. As will be pointed out more fully hereinafter, the relative size of the openings 33 and 34 is also of importance in the operation of this tower. As a further safeguard against the passage of sorbant particles through the perforations of the flume 18, the flume is encased in a wire cloth or screen sleeve 35 which completely covers the perforated portions of said flume. The bed of sorbant material is thus securely maintained in position.

An access opening or manhole is provided at the lower end of the sorbant bed by means of a relatively large diameter pipe 36 which passes through the lower portion of the vessel 16 and through one side of the shell 16 near the lower end thereof. The outer end of the pipe 36 is closed by a suitable plate 37. Similarly, an access opening is provided at the upper end of the tower shell by a vertically extending pipe 38 connected into the domed head 11 and being closed by a suitable plate 39. With this arrangement, sorbant material may be introduced into the tower through the pipe 38, and may be removed when necessary through the pipe 36.

A gas or fluid inlet conductor 40 extends radially through the side wall of the vessel 10 adjacent the medial portion thereof and communicates with the annulus B between the inner wall of the vessel 10 and the perforated shell 16. A lateral or circumferential diverter box 41 of the usual structure as common to this art, overlies the open inner end of the conductor 40 and serves to cause influent gases or liquids to be diverted and directed circumferentially of the annulus B upon entry thereinto.

At the lower end of the vessel 10, the fluid stream discharge conductor 22 has a suitable pipe 42 secured to its connecting member 23, and a branch pipe 43 is connected into the pipe 42. Further, a reactivating fluid discharge pipe 44 is connected into the vessel through the side wall thereof so as to extend into the chamber A, and is provided with a downwardly directed branch 45 within said chamber A, the branch 45 extending to a point closely adjacent the dished bottom 12 of the vessel. A second or auxiliary discharge conductor 46, similar to the conductor 44 and 45 is also provided within the chamber A having its inlet closely adjacent the dished bottom of the vessel 10 and extending through the side walls of said vessel.

In the operation of the sorbing tower, the fluid stream which normally is gaseous in nature but may contain particles or "slugs" of liquid, is admitted through the connection 40 and is caused by the diverter 41 to flow in a circumferential pass within the annulus B. At the same time, the fluid stream spreads out vertically so as to fill substantially the entire annulus, thus promoting uniform flow through the entire length of the perforated shell 16. Normally, the incoming fluid stream is under a considerable pressure and is flowing with an appreciable velocity. The circumferential flow under such conditions of velocity and pressure therefore causes particles of liquid within the gaseous stream to be thrown outwardly onto the inner surface of the vessel 10 from which they drain downwardly to the compartment A passing through peripheral notches 47 cut in the supporting rings 14. In this manner, a major portion of the liquids present in the stream are prevented from reaching the bed C of sorbant material and thereby contaminating the same unduly.

From the annulus B, the fluid stream passes through the perforations 33 of the shell 16. As stated hereinbefore, the perforations are relatively small whereby a pressure drop occurs as the fluid stream passes therethrough, this creation of a pressure drop resulting in a back pressure becoming existent within the annulus B and thereby further increasing the uniformity of distribution of the gaseous stream throughout the height of said annulus. Because the flow of the fluid stream is effected throughout the height of the sorbant bed C, passing radially thereof toward the flume 18, it is manifest that the flow of fluid at any point in the sorbing bed will be relatively low. A given volume of fluid is spread out over the entire surface of the shell 16, and this great increase in the area of flow of the stream permits and results in the obtaining of low velocities. At such low velocities, desiccation or sorbation of any type may be accomplished by a much shorter passage or pass through the sorbing material, and proper and complete treatment of the stream may thus be accomplished within the radial dimension of the sorbing bed C.

The gas passes from the bed through the central flume 18, it again being noted that the openings 34 of said flume are relatively small so as to cause a pressure drop and create a further back pressure within the bed of sorbing material. Here again, the creation of the back pressure causes more uniform distribution of the flow throughout the height or length of the sorbing bed and the entire bed is thus put to efficient and beneficial use. The treated gas flows from the tower by means of the conductors 22 and 42.

When it becomes necessary or desirable to reactivate or regenerate the bed of sorbant material, the flow through the conductor 40 is shut off and heated reactivating gas or fluid is admitted through the branch pipe 43. The reactivating gas flows upwardly into the flume 18 and outwardly through the sorbant bed C and the shell 16. The flow is thus reversed during the reactivating process. Here again, the smallness of the perforations 34 and 33 result in the creation of back pressures whereby the reactivating gas is more uniformly distributed throughout the height of the sorbant material bed C, and more efficient and more complete reactivation is thus achieved.

The reactivating gas passes into the annulus B and downwardly through the recesses or notches 47 into the chamber A. Since the downwardly directed branch 45 of the reactivating gas outlet line 44 is positioned closely adjacent the dished bottom 12, any liquids which may have collected within the chamber A during the sorbing cycle will immediately be driven outwardly through the pipe 44 and thus prevented from ever coming into contact with the bed or sorbing material. This feature is important in that it protects the bed from contamination by liquids, some of which may have relatively high boiling points and would be difficult to remove from the sorbant material by vaporization. Since the bed is kept free of such liquids, the temperature of the reactivating gas does not need to be excessive and savings in heating costs naturally result.

It is further to be noted that the hot reactivating gas is introduced into the center of the sorbant bed whereby incidental heat losses from the reactivating gas are largely avoided. The function of the gas is to heat the sorbant bed sufficiently to drive therefrom any liquids which may have been formed or which may have collected therein, and later to condense and recover such liquids by cooling of the reactivating gas stream. In the usual type of tower, a problem is encountered in being required to heat the entire tower to reactivate the sorbing material since this requires also the heating of the vessel or shell within which the sorbant material is housed. In towers adapted to handle gas under high pressure, the necessary thickness of the vessel walls results in a tower structure of considerable metallic mass and with considerable capacity for absorbing heat. When the entire tower must be heated, large quantities of heat are lost by absorption into the tower shell, as much as fifty per cent of the introduced heat being used in this manner in some cases.

With the present invention, this objectionable feature is eliminated since the work of the reactivating gas is done as soon as it passes through the inner perforated shell 16. Indeed, it is desirable to cool the reactivating gas at this point, and this is accomplished by passing the gas in contact with the inner wall of the vessel 10. Not only is it not necessary to heat the vessel 10 to the full reactivating temperature required for the sorbant bed C, but the cooling of the reactivating gas accomplished through the outer walls of the vessel 10 reduces the load upon the cooling equipment (not shown) into which the reactivating gas must be passed after leaving the tower.

A still further advantage results from avoiding the necessity of insulating the vessel 10. In the older types of towers in which the entire vessel must be heated to a reactivating temperature, the outer wall of the towers or tower vessels are normally covered with a heavy layer of insulating material to prevent heat radiation and reduce to some extent the quantity of heat required for reactivation. In my invention, the expense of such insulation is avoided because its absence does not adversely affect the reactivating process, and indeed, is advantageous insofar as cooling of the reactivating stream is concerned. Of course, an ancillary advantage results in the elimination of maintenance of the insulating coating which is normally a relatively fragile material and is easily subject to damage.

A portion of the reactivating gas stream may pass downwardly through the grating 28, and, of course, any liquids which may accumulate within the bed of sorbant material during the treating cycle may also drain and flow downwardly through said grating into the chamber A.

At some times, it may be desirable to drain off manually the accumulated liquids in the bottom of the chamber A, and for this purpose the connection 46 is provided. Since there is always a pressure within the vessel 10 during the treating or the reactivating cycle, the mere opening of the conductor 46 will result in a blowing off of accumulated liquids therethrough.

The foregoing description of the inventon is explanatory thereof and various changes in the size, shape and materials, as well as in the details of the illustrated construction may be made, within the scope of the appended claims, without departing from the spirit of the invention.

What I claim and desire to secure by Letters Patent is:

1. A sorbing tower including, an elongate vertical vessel, a foraminous shell extending longitudinally of the interior of the vessel and spaced therefrom to form an annular flow space within the vessel and between the shell and said vessel, a fluid stream inlet conductor connected into the side wall of the vessel and having an outlet into the flow space, said outlet being directed approximately circumferentially of said flow space, a foraminous partition extending across the lower portion of the vessel and defining a liquid accumulating space in the vessel therebelow, the shell and partition being constructed to receive and confine a bed of sorbant material in the space within said shell and above the partition, a flume extending interiorly of the shell and longitudinally thereof, the flume being foraminous in that portion thereof extending from a point spaced below the upper end of the vessel to a point spaced above the partition whereby sorbant material will enclose the entire foraminous portion of the flume, a fluid stream outlet conductor from the flume extending through the side wall of the vessel adjacent the lower end thereof, a branch conductor connected into the outlet conductor for supplying reactivating fluid to the bed of sorbant material, and a reactivating fluid outlet conductor extending exteriorly of the vessel from a point within and closely adjacent the bottom of the vessel.

2. A sorbing tower as set forth in claim 1, wherein the portion of the partition underlying the flow space is provided with drainage openings for the flow space.

3. A sorbing tower including, an elongate vessel, a foraminous shell extending longitudinally of the vessel and spaced therefrom to form a flow space, a fluid stream inlet conductor connected into one side wall of the vessel and having an outlet into the flow space, a foraminous flume extending interiorly of the shell, the space between the flume and the shell being adapted to receive a sorbant material, an outlet conductor from the flume, a diverter box within the flow space covering the outlet of the fluid stream conductor, the lower end of the shell being spaced from the lower end of the vessel to form a liquid-collecting space in said lower end of the vessel, an annular supporting ring carried by the inner wall of the vessel near the lower end thereof, the shell being supported in the vessel on said ring, a sectional grate carried by the ring and covering the lower end of the shell so as to support the bed of sorbant material therein, the outlet conductor extending through the supporting ring, and a supporting flange carried by the outlet conductor substantially in horizontal alinement with the supporting ring to aid in supporting the grate.

4. A sorbing tower including, an elongate vessel, a foraminous shell extending longitudinally of the vessel and spaced therefrom to form a flow space, a fluid stream inlet conductor connected into one side wall of the vessel and having an outlet into the flow space, a foraminous flume extending interiorly of the shell, the space between the flume and the shell being adapted to receive a sorbant material, an outlet conductor from the flume, a diverter box within the flow space covering the outlet of the fluid stream conductor, the lower end of the shell being spaced from the lower end of the vessel to form a liquid-collecting space in said lower end of the vessel, an annular supporting ring carried by the inner wall of the vessel near the lower end thereof, the shell being supported in the vessel on said ring, a sectional grate carried by the ring and covering the lower end of the shell so as to support the bed of sorbant material therein, and braces secured to the flume and extending through the shell into engagement with the inner wall of the vessel, the braces being rigidly affixed to the shell so as to center the flume therein and having sliding engagement with the inner wall of the vessel so as to center the shell within the vessel while permitting the removal of the shell therefrom.

JOSEPH L. MAHER.

REFERENCES CITED

The following references are of record in the file of this patent:

UNITED STATES PATENTS

| Number | Name | Date |
|---|---|---|
| 346,038 | Goldshmid | July 20, 1886 |
| 1,097,870 | Moscicki | May 26, 1914 |
| 1,429,856 | Etter | Sept. 19, 1922 |
| 1,863,656 | Hartman | June 21, 1932 |
| 2,064,962 | Waters | Dec. 22, 1936 |
| 2,083,732 | Moore et al. | June 15, 1937 |
| 2,101,555 | Moore et al. | Dec. 7, 1937 |
| 2,195,738 | Ridler et al. | Apr. 2, 1940 |
| 2,273,779 | Dickey et al. | Feb. 17, 1942 |
| 2,359,660 | Martin et al. | Oct. 3, 1944 |